(12) United States Patent
Hanson et al.

(10) Patent No.: US 12,031,841 B2
(45) Date of Patent: Jul. 9, 2024

(54) METHODS FOR APPROXIMATE INERTIAL SENSOR BIAS SELF-CALIBRATION

(71) Applicant: Honeywell International Inc., Charlotte, NC (US)

(72) Inventors: Timothy J. Hanson, Plymouth, MN (US); Keith F Winegar, Lino Lakes, MN (US)

(73) Assignee: Honeywell International Inc., Charlotte, NC (US)

( * ) Notice: Subject to any disclaimer, the term of this patent is extended or adjusted under 35 U.S.C. 154(b) by 97 days.

(21) Appl. No.: 17/732,187

(22) Filed: Apr. 28, 2022

(65) Prior Publication Data

US 2023/0349722 A1 Nov. 2, 2023

(51) Int. Cl.
G01C 25/00 (2006.01)
G01C 19/42 (2006.01)
G01C 21/16 (2006.01)
G01C 23/00 (2006.01)

(52) U.S. Cl.
CPC .......... G01C 25/005 (2013.01); G01C 19/42 (2013.01); G01C 21/16 (2013.01); G01C 23/00 (2013.01)

(58) Field of Classification Search
CPC ...... G01C 25/005; G01C 19/42; G01C 21/16; G01C 23/00
See application file for complete search history.

(56) References Cited

U.S. PATENT DOCUMENTS

| 4,275,605 A * | 6/1981 | Kennel ................. G01C 21/18 74/5.34 |
| 7,912,664 B2 | 3/2011 | Rozelle |
| 8,095,250 B2 | 1/2012 | Hanson et al. |

(Continued)

FOREIGN PATENT DOCUMENTS

WO 2021074851 A1 4/2021

OTHER PUBLICATIONS

Shen, Zhizhen et al., "System and Method to Reduce Vertical Reference Unit Unreferenced Heading Drift Error", U.S. Appl. No. 17/668,277, filed Feb. 9, 2022; pp. 1 through 25, Published: US.

(Continued)

Primary Examiner — Lina Cordero
Assistant Examiner — Lyudmila Zaykova-Feldman
(74) Attorney, Agent, or Firm — Fogg & Powers LLC

(57) ABSTRACT

A method and system for providing gyroscope bias self-calibration are described herein. The method comprises powering on one or more gyroscopes; after a predetermined first period of time, and upon determining that the one or more gyroscopes is stationary, measuring input rates of rotation during a predetermined second period of time; and determining an average rate of rotation for each gyroscope channel based upon the measured input rates of rotation during the predetermined second period of time. After determining the average rate of rotation and after the predetermined second period of time, the method further comprises commencing additional measurements by the one or more gyroscopes; determining calibrated gyroscope measurements by subtracting the average rate of rotation from each of the additional measurements; and providing, at the output of the one or more gyroscopes, the calibrated gyroscope measurements.

20 Claims, 7 Drawing Sheets

(56) References Cited

U.S. PATENT DOCUMENTS

| | | | | |
|---|---|---|---|---|
| 8,464,433 | B1* | 6/2013 | Cardarelli | G01C 19/38 |
| | | | | 33/356 |
| 10,088,333 | B2 | 10/2018 | Mangano | |
| 2005/0256659 | A1* | 11/2005 | Malvern | G01C 19/567 |
| | | | | 702/96 |
| 2006/0169021 | A1 | 8/2006 | Silverstein | |
| 2010/0299003 | A1* | 11/2010 | Hanson | G01C 21/183 |
| | | | | 701/4 |
| 2011/0301900 | A1* | 12/2011 | Patel | G01C 25/00 |
| | | | | 702/104 |
| 2012/0203487 | A1* | 8/2012 | Johnson | G01C 25/005 |
| | | | | 702/141 |
| 2014/0102168 | A1 | 4/2014 | Kohn et al. | |
| 2015/0121989 | A1* | 5/2015 | Orzechowski | H01Q 3/08 |
| | | | | 73/1.38 |
| 2016/0202060 | A1* | 7/2016 | Liu | G01C 19/5776 |
| | | | | 73/504.12 |
| 2016/0231138 | A1 | 8/2016 | Roberts-Thomson et al. | |
| 2019/0120657 | A1* | 4/2019 | Senkal | G01R 25/00 |
| 2019/0277655 | A1 | 9/2019 | Masad et al. | |
| 2019/0293451 | A1* | 9/2019 | Cook | G01C 25/00 |
| 2019/0390976 | A1* | 12/2019 | Anderson | G06F 3/013 |
| 2020/0319611 | A1* | 10/2020 | Ganapathy Ramalingam | |
| | | | | G06F 11/3082 |

OTHER PUBLICATIONS

Great Britain Intellectual Property Office, "Patents Act 1977: Search Report under Section 17(5)", dated Mar. 11, 2024, from GB Application No. GB2305396.0, from Foreign Counterpart to U.S. Appl. No. 17/732,187, pp. 1 through 3, Published: GB.

* cited by examiner

METHODS FOR APPROXIMATE INERTIAL SENSOR BIAS SELF-CALIBRATION

BACKGROUND

Inertial sensors such as gyroscopes in an inertial measurement unit (IMU) are known to drift out of calibration over an extended period of time. For example, gyroscopes in a typical micro-electro-mechanical systems (MEMS) based IMU can detrimentally drift out of a specified or required performance over time, without some mechanism for re-calibration of such gyroscopes.

SUMMARY

A method and system for providing gyroscope bias self-calibration are described herein. The method comprises powering on one or more gyroscopes; after a predetermined first period of time, and upon determining that the one or more gyroscopes is stationary, measuring input rates of rotation during a predetermined second period of time; and determining an average rate of rotation for each gyroscope channel based upon the measured input rates of rotation during the predetermined second period of time. After determining the average rate of rotation and after the predetermined second period of time, the method further comprises commencing additional measurements by the one or more gyroscopes; determining calibrated gyroscope measurements by subtracting the average rate of rotation from each of the additional measurements; and providing, at the output of the one or more gyroscopes, the calibrated gyroscope measurements.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Methods and systems for providing approximate inertial sensor bias self-calibration are described herein. The present methods address the need for inertial sensors, such as gyroscopes in an inertial measurement unit (IMU), to have self-calibration functionality. For example, in a micro-electro-mechanical systems (MEWS) based IMU, the gyroscopes can drift out of calibration over prolonged periods of time. Thus, having the capability to self-calibrate in situ is beneficial as the useful performance life of the IMU can be extended.

The present approach is particularly useful in its applicability to lower-end tactical IMUS, where approximate self-calibration can be useful. The technical benefits of the present methods include reduced performance risk over time, and improved likelihood of preserved sensor bias performance compared to conventional devices, thus enhancing IMU reliability. The present approach has the benefit of prolonging IMU gyroscope bias performance in the field over the lifetime of the IMU.

The present methods can be implemented using a software algorithm, which can reside in the IMU and process sensor data at power-up and during operation. The algorithm estimates sensor bias corrections, and applies the corrections under certain conditions to the output data of the IMU, helping to preserve the performance of the IMU. The software algorithm can be embedded in a microprocessor of the device, such that the software algorithm runs in the device/unit as firmware.

In one example implementation, an IMU is powered on for a self-calibration test. If the IMU is determined to be stationary, so that the only rate measured is Earth's rate, then for each gyroscope channel, a gyroscope bias is estimated for a first time period after the power on. If the gyroscope bias is greater than a threshold bias value, the gyroscope bias is subtracted from a zero-order bias term for the rest of the power cycle. The gyroscope bias can be saved for future use. If the IMU is determined not to be stationary during a first time period, then no such bias estimate is made, and a previously calculated bias correction (if it exists) is subtracted from a zero-order bias term for the rest of the power cycle.

In some embodiments, a host system can send a command to an IMU to perform a self-calibration test function when a condition is met (e.g., weight on wheels for an aircraft). In some embodiments, a maximum bias correction amount can be set so that the correction occurs incrementally over time.

Further details related to the present methods and systems are described as follows and with reference to the drawings.

Figure 1:
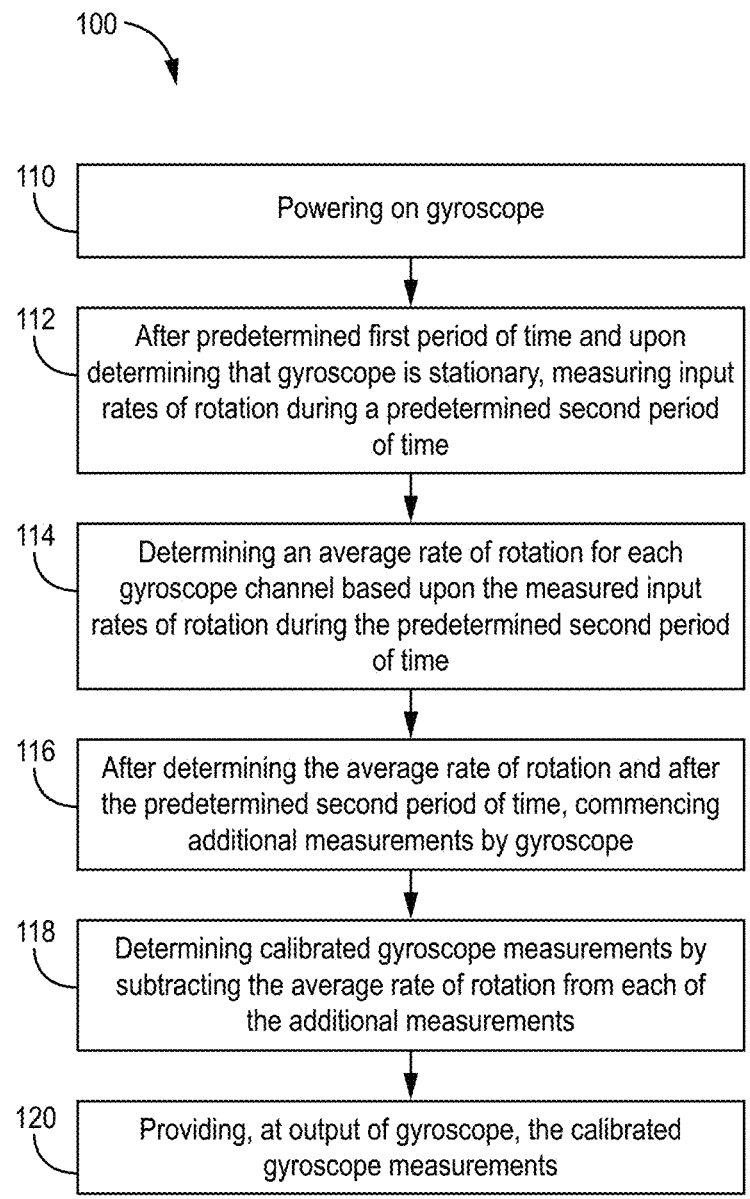
FIG. 1 is a flow diagram of a method for providing calibrated measurements at an output of a gyroscope, according to one implementation.

FIG. 1 is a flow diagram of a method 100 for providing calibrated measurements at an output of a gyroscope, according to one implementation. The method 100 comprises powering on the gyroscope (110), and after a predetermined first period of time, and upon determining that the gyroscope is stationary, measuring input rates of rotation during a predetermined second period of time (block 112). The method 100 determines an average rate of rotation for each gyroscope channel based upon the measured input rates of rotation during the predetermined second period of time (block 114). After determining the average rate of rotation and after the predetermined second period of time, method 100 commences additional measurements by the gyroscope (block 116), during which time the gyroscope is assumed to no longer be stationary. The method 100 then determines calibrated gyroscope measurements by subtracting the average rate of rotation from each of the additional measurements (block 118), and provides, at the output of the gyroscope, the calibrated gyroscope measurements (block 120).

Figure 2:
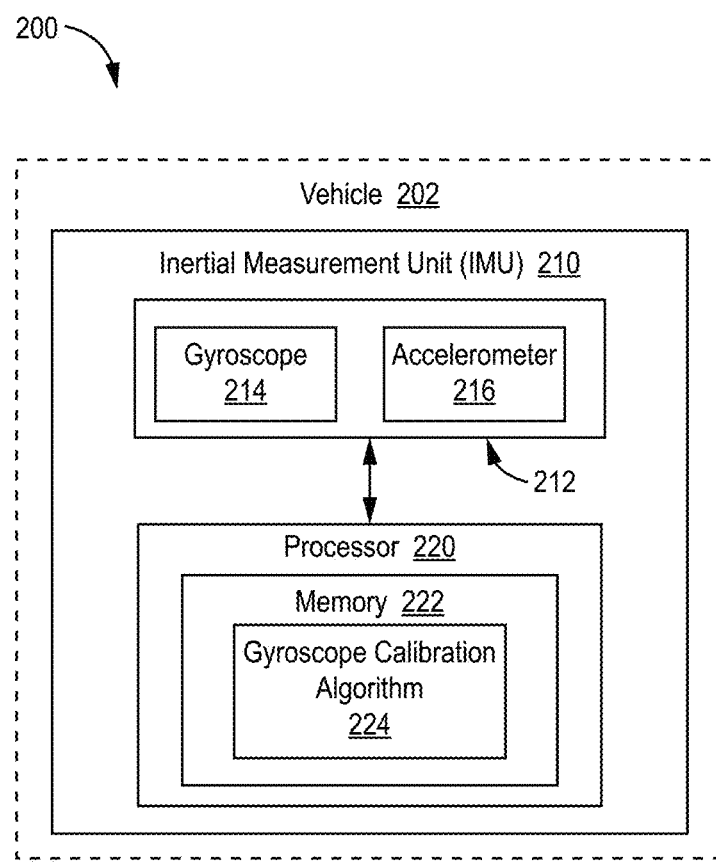
FIG. 2 is a block diagram of a system that can be implemented with a gyroscope calibration method, according to one embodiment.

FIG. 2 is a block diagram of a system 200 that can be implemented with a gyroscope calibration method, such as described above and shown in FIG. 1, according to one embodiment. The system 200 includes an inertial measurement unit (IMU) 210 with an associated processor 220, onboard a vehicle 202 such as an aircraft, a projectile, a missile, or other dynamic object using the IMU for attitude determination. The vehicle 202 is configured to determine its attitude, and possibly position using IMU 210. In some embodiments, a global navigation satellite system (GLASS) receiver or other aiding sensors (not shown), can be used along with MU 210 for determining the attitude and position of vehicle 202.

The MU 210 includes a set of inertial sensors 212 that are configured to provide acceleration and attitude data for vehicle 202. In one implementation, inertial sensors 212 includes a gyroscope device 214 for sensing angular rate (i.e., rotational velocity or angular position), and an accelerometer device 216 for sensing a linear change in velocity (i.e., acceleration) along a given axis. The gyroscope device 214 includes at least one gyroscope with an input axis in the direction of motion of vehicle 202, or more typically three mutually orthogonal input axes. The accelerometer device 216 includes at least two accelerometers for measuring acceleration in directions orthogonal to each other and orthogonal to the gyroscope sensing spin rate. In another typical configuration, IMU 210 has three mutually orthogonal gyroscope axes and three mutually orthogonal accelerometer axes, co-aligned with each other As shown in FIG. 2, processor 220 can be incorporated as part of MU 210. In other embodiments, processor 220 can be implemented in a separate location onboard vehicle 202, while being in operative communication with IMU 210. The processor 220 has an associated memory 222, in which a gyroscope calibration algorithm 224 is stored as part of executable software. The gyroscope calibration algorithm 224 includes program instructions, which are executable by processor 220, to perform a method for providing calibrated measurements at an output of gyroscope device 214.

Figure 3:
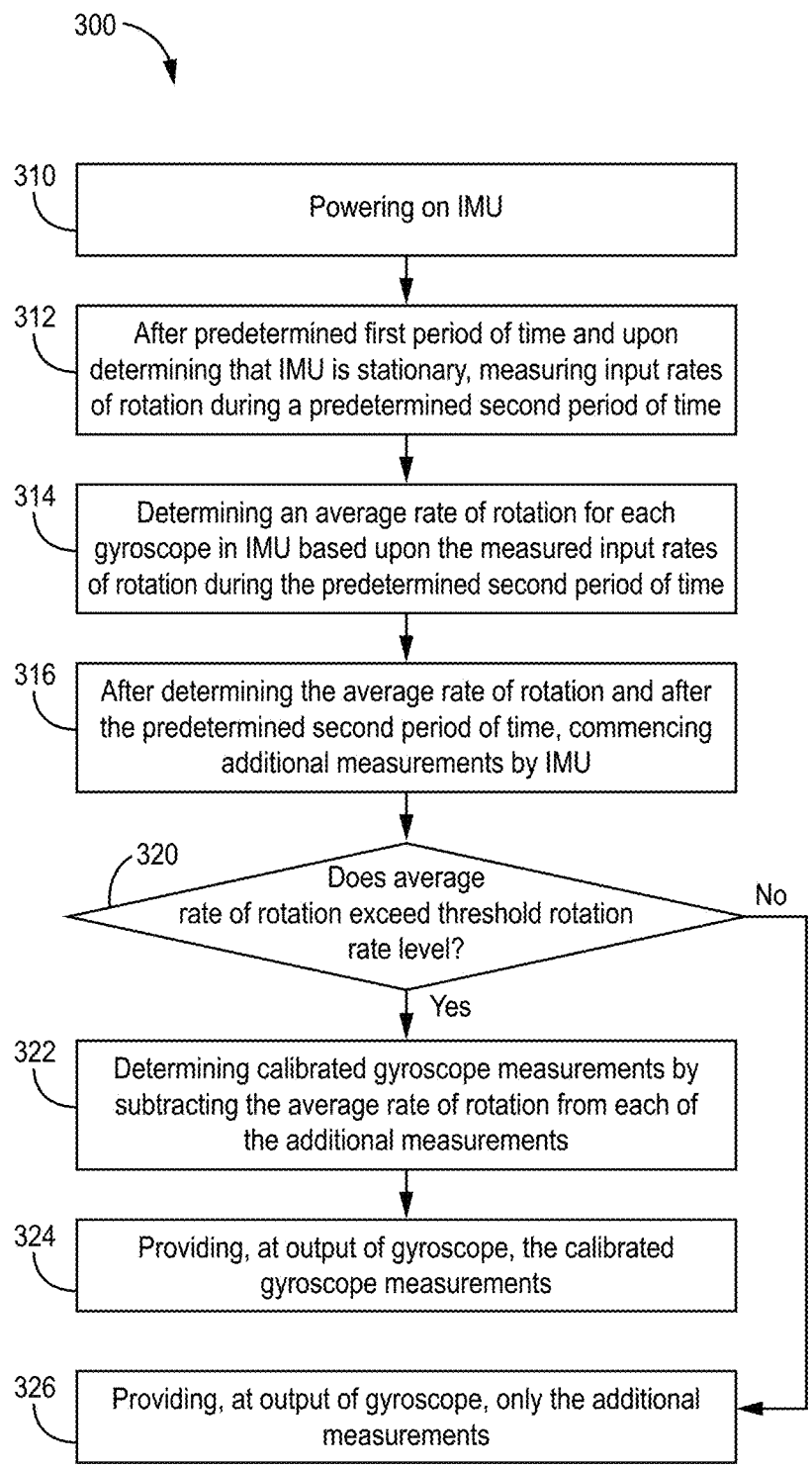
FIG. 3 is a flow diagram of a method for gyroscope calibration in an inertial measurement unit (IMU), according to another implementation.

FIG. 3 is a flow diagram of a method 300 for gyroscope calibration in an IM according to another implementation. The method 300 comprises powering on the IMU (block 310), and after a predetermined first period of time, and upon determining that the IMU is stationary, measuring input rates of rotation during a predetermined second period of time (block 312). The method 300 determines an average rate of rotation for each gyroscope in the IMU based upon the measured input rates of rotation during the predetermined second period of time (block 314). These average rates of rotation, obtained while the IMU is stationary, are considered gyroscope "bias errors". After determining the average rate of rotation and after the predetermined second period of time, method 300 commences additional measurements by the IMU (block 316), during which time the IMU is assumed to no longer be stationary.

The method 300 then determines whether the average rate of rotation exceeds a threshold rotation rate level (block 320). This threshold rotation rate level is chosen so that only significant average stationary gyroscope bias levels are corrected for. If the average rate of rotation exceeds the threshold rotation rate level, method 300 computes calibrated IMU gyroscope measurements by subtracting the average rate of rotation from each of the additional measurements (block 322). The method 300 then provides, at the output of the IMU gyroscope, the calibrated IMU gyroscope measurements (block 324). Returning to block 320, if the average rate of rotation does not exceed the threshold rotation rate level, then method 300 provides, at the output of the IMU gyroscope, only the additional measurements (block 326).

Further details related to the implementation of the present bias self-calibration methods, including the IMU gyroscope calibration methods, is described hereafter.

IMU Gyroscope Self-Calibration

Providing for in-situ IMU calibration requires knowledge that the IMU is "stationary" so that the maximum IMU gyroscope input rate is less than or equal to 15 degrees per hour (dph), which is the Earth's spin-rate. Also needed is the ability to cycle power on and off to the IMU, with a given timing accuracy (e.g., about 10 ms). It is also useful to have the ability to read the IMU built-in test (BIT) status, which indicates if self-calibration is completed or not, and the ability to read out IMU data, which allows examination for bias correction after the self-calibration.

Various assumptions can also be made, including an over-time shift of gyroscope performance that is primarily (mostly) observed as a change of the average bias shift over all temperatures (i.e., zero-order bias shift). Also, a choice can be made to determine if a correction of some gyroscope bias is worthwhile (e.g., to reduce a 300 dph average bias to +/−15 dph (Earth's spin-rate) would be worthwhile, whereas not so for a 25 dph average bias). The main principal is that gyroscope bias shift can be measured to within +/−15 dph in-situ if the IMU is stationary. Finally, the following expression represents a polynomial model of gyroscope bias as a function of temperature:

$$\text{Gyro bias } (T) = W_0 + W_1 * T + W_2 * T^2 + W_3 * T^3$$

where the W terms represent the coefficients of a $3^{rd}$ order polynomial, and T is the temperature. Another assumption for the above methods 100, 300 and system 200 to work optimally is that the Wo term in this model (the zero-order term) embodies most of the bias change that the present bias self-calibration method corrects for.

Figure 4:
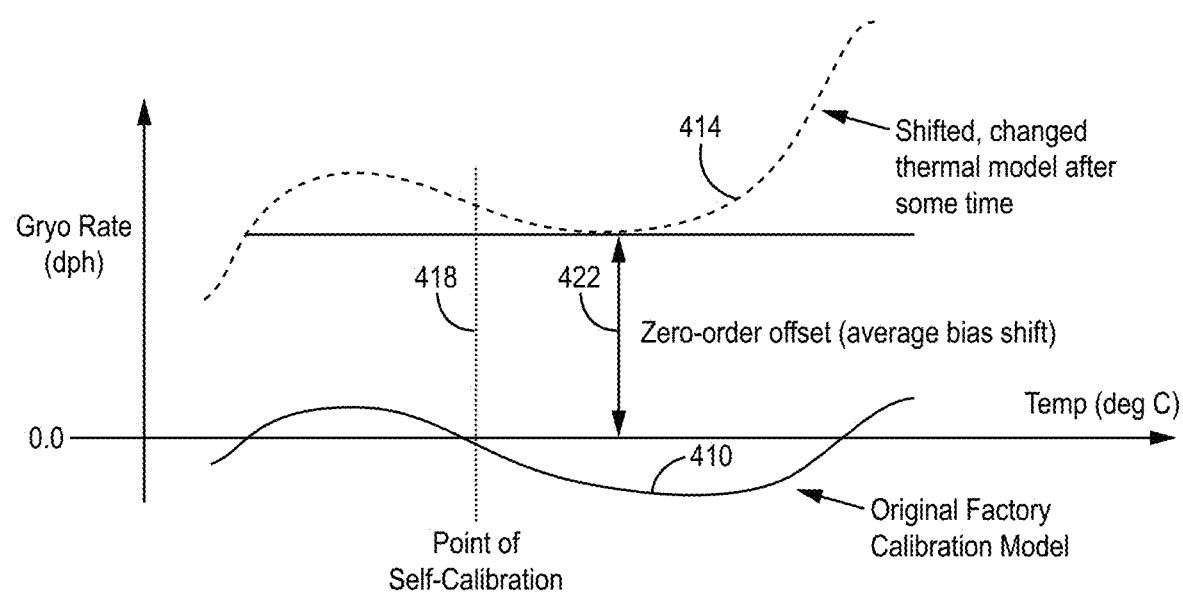
FIG. 4 is a graphical representation of an exemplary IMU gyroscope self-calibration method, showing gyroscope rate with respect to temperature.

FIG. 4 is a graphical representation of an example IMU gyroscope bias model using the polynomial model described in the previous paragraph, showing the gyroscope rate (dph) vs. temperature. A plot line 410 indicates an original factory calibration model, and a plot line 414 indicates a shifted, changed thermal model after some time period. The point of self-calibration correction is indicated by a dotted line 418. A zero-order offset (average bias shift) is indicated at 422. Note in this example the self-calibration correction indicated at 418 is close to the actual desired correction indicated at 422, which is the desired result.

During a calibration power-cycle, the IMU collects gyroscope data when powered on, and is shut off at a predetermined time (e.g., 20 seconds). Normal non-calibration power cycles are assumed to not end at exactly the predetermined time (e.g., 20 seconds+/−100 ms). The mean bias shift of each gyroscope in the IMU is saved to memory (zero-order offsets). A time value (counter value since power-on) is saved, which is the calibration timer, and a status word has a SC (Self-Calibration) bit set to 1 (default=0). During the next power-cycle, the IMU software immediately checks the calibration timer value. If this value is, for example, 20 seconds+/−100 ms, then the software applies zero-order gyroscope offsets to compensation. The offsets can be placed in multi-plex status words, for optional use by the host.

Figure 5:
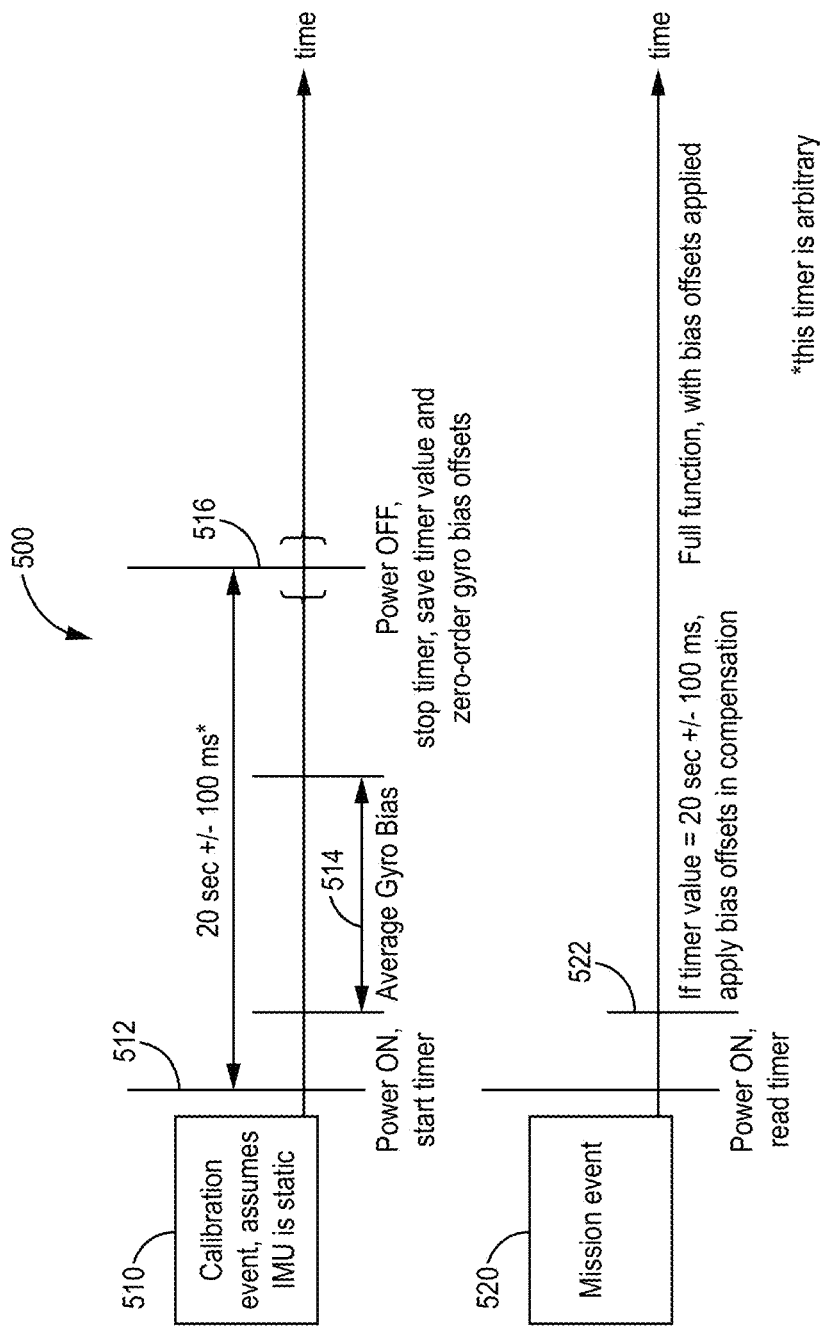
FIG. 5 is a flow diagram of an exemplary in-situ IMU gyroscope self-calibration method.

FIG. 5 is a flow diagram of an exemplary in-situ IMU gyroscope self-calibration method 500. During a calibration event it is assumed that the IMU is static (block 510). After a power ON of the IMU, method 500 starts a timer at 512, and an average gyroscope bias is determined during a period of time 514. Thereafter, the IMU is powered OFF at 516, the timer is stopped, and method 500 saves a timer value and zero-order gyroscope bias offsets. FIG. 5 shows an example time of 20 seconds+/−100 ms in which the IMU is powered on, although this time is arbitrary. During a mission event (block 520), the IMU is powered ON, and a timer value is read at 522. If the timer value is, for example, 20 seconds+/−100 ms, method 500 applies the bias offsets in compensation. The IMU is then at full function, with the bias offsets applied.

The present approach can be extended for use at different in-situ temperatures. For example, the present approach can be repeated for three different temperatures (hot, room, and cold), and the resultant three sets of bias offsets can be applied.

Additional bias estimation techniques can be applied to the IMU gyroscope and accelerometer channels. For example, each gyroscope channel's average bias can be continuously estimated with a long-time constant (e.g., 30 seconds) filter, and that bias estimate can be provided in the IMU output message status word. Such a long time-constant filter extracts the "DC" channel bias over time. This is another estimate of overall channel bias, which is estimated in real time, for longer missions. The time constant can be shorter, or longer, depending on the mission application. The user can, if desired, utilize these bias estimates in vehicle guidance or navigation applications as needed.

IMU Gyroscope Bias Drift Management

Figure 6:
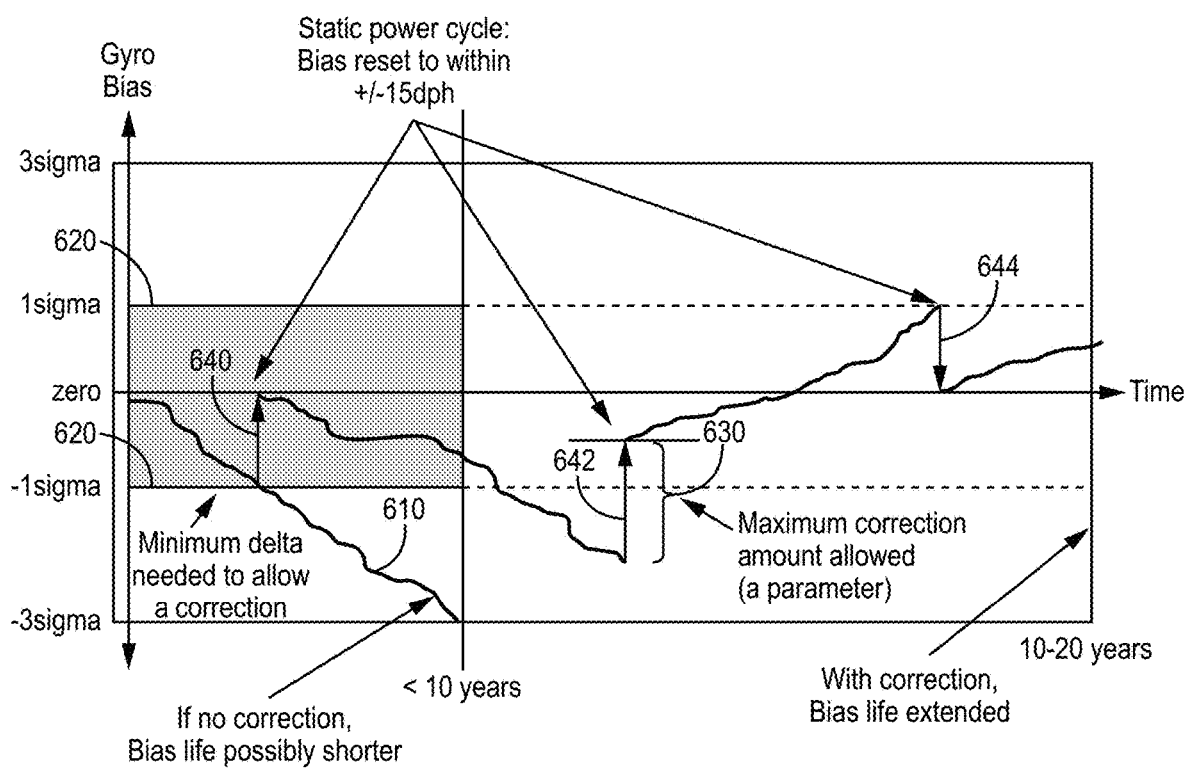
FIG. 6 is a graphical representation of an exemplary approach to gyroscope bias drift management.

FIG. 6 is a graphical representation of an approach to gyroscope bias drift management, which can be implemented for an IMU using the present methods. FIG. 6 shows the gyroscope bias (sigma) with respect to an expected life of the device (measured in years). A downward trend line 610 indicates an increase in a negative bias (to −3 sigma) during a 10 year period for the device. This downward trend would continue if no bias correction were to be made, resulting in a possibly shorter life for the device. With a correction to the bias, the life of the device can be extended, such as shown to about 10-20 years.

A minimum delta needed to allow for a correction can be set, for example, at −1 sigma (or +1 sigma), as indicated at 620. A maximum correction amount allowed (a parameter) can also be set as indicated at 630. During a static power cycle for the IMU, the bias is reset to within +/−15 dph, at various stages during the lifetime of the IMU, as indicated at 640, 642, and 644.

It is known that when an IMU is stationary (static), then the IMU gyroscope rate must be less than or equal to 15 dph (Earth's spin-rate). In the present approach, a conditional bias null can be done when proper conditions are met: the function is enabled; there is a high probability that the IMU is stationary (sitting still); and at least X dph of bias drift is measured (to avoid trivial corrections). The host system can then send a command to perform the bias correction.

Various features can also be provided to implement the present approach to gyroscope bias drift management. For example, parameterized features can be provided to make the corrective deltas adjustable (e.g., as little as 7 dph up to 120 dph or more per time); and to allow bias correction to occur no more than every N power-cycles; and to disable the bias correction after M corrections have occurred.

The bias trim values can be immediately applied to the output of the IMU, or bias trim values can be saved in the output message status word, allowing the user to apply the value as needed. Alternatively, the trim values can be saved in a "reserved" word, an unlabeled part of the IMU output message, to be used if needed in the future by a user and revealed by the IMU provider.

Detecting IMU Gyroscope is Stationary

There are various approaches to detecting that the IMU gyroscope is stationary during startup, in implementing the present gyroscope self-calibration methods. For example, if an acceleration vector magnitude is 1 G+/−x mg, this indicates no acceleration, and thus likely no motion. If the acceleration vector magnitude is 1 G+/−x mg AND the vector direction of that 1 G corresponds to the IMU or vehicle it is in having a "static" orientation, it is even more likely the IMU is static. Some IMU accelerometers are accurate enough to measure this parameter. Also, the gyroscope vector rate needs to be less than a given X dph for the IMU to be even considered static. For example, a gyro rate value of 5 deg/sec or more would indicate a moving, non-stationary IMU, whereas a gyro rate of 0.5 deg/sec or less could be all bias and therefore the IMU could be static. Such values can be selectable as parameters that can be customized for a particular IMU accuracy and IMU application. In addition, some IMUs have a "sleep status" detection function, which can be used for detecting that the IMU is stationary. In some embodiments, a user input can be provided so that a host command can be given that the IMU is stationary. In addition, a combination of any of the above approaches can be used to detect that the IMU is stationary.

In some embodiments when using the present approach for an IMU on an aircraft, the IMU can be considered as "stationary" as long as the aircraft is flying straight and level. This too can be a parameter that can be selected based upon the IMU application and mission scenario.

In the present approach, the risks are generally low of a false detection that the IMU is stationary. The probability is low due to efficacy of the above stationary tests, and the likelihood that an operational scenario is stationary being high. The present method can also limit the authority of bias correction (e.g., allow no more than a small amount of bias correction, say <10 deg/hour per calibration time) to mitigate the possibly negative consequences of a false "IMU stationary" detection. For example, the limit can be a fraction of the IMU grade's bias (e.g., if 120 dph, then limit null max to 120/2).

It should be noted that a bias only (zero order term) does not correct a full 3rd order temperature model. The present method can limit the corrective authority to be much less than a thermal model variation. This is less important if a known operational scenario has little temperature variation. Typically, a temperature dependent variation is much less than a zero-order bias change over time. Also, enabling or disabling of the bias correction all together may depend on a specific device type mission, and this too can be a selectable parameter by the user.

Bias Trim Vs Temperature

Figure 7:
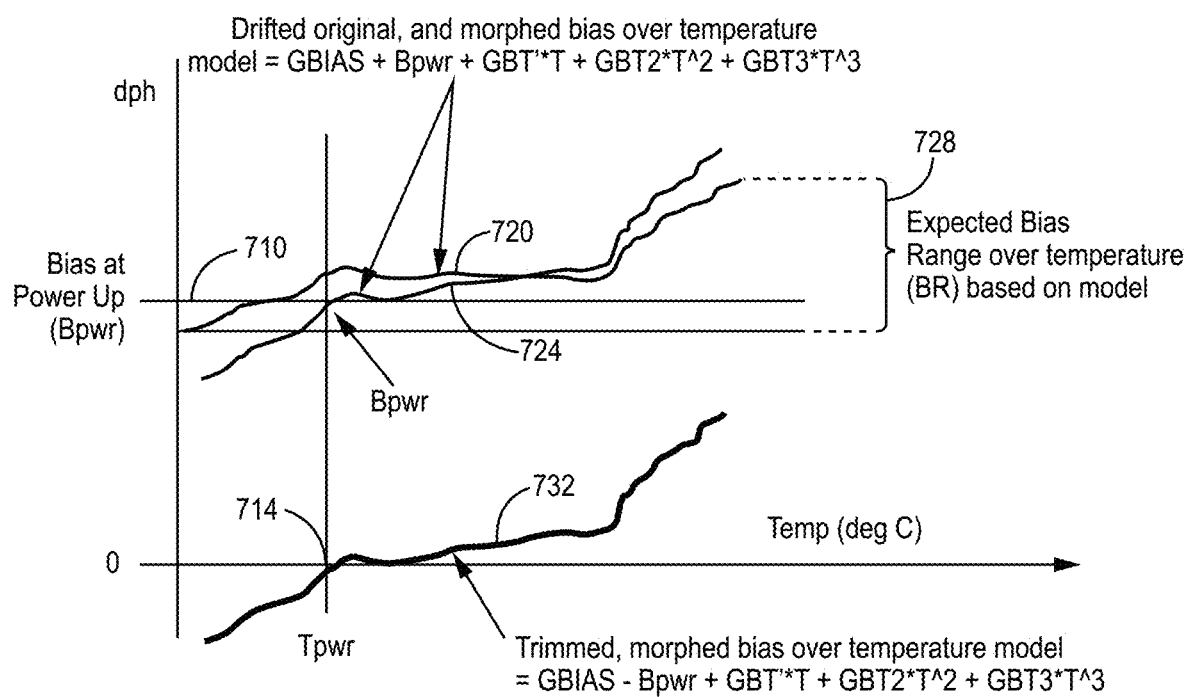
FIG. 7 is a graphical representation of a gyroscope self-calibration method, showing bias trim with respect to temperature.

FIG. 7 is a graphical representation of a gyroscope self-calibration method, showing a bias trim (in units of degrees per hour) vs. temperature. FIG. 7 shows the bias at power up (Bpwr) at 710, and the temperature at power up (Tpwr) at 714. A drifted original gyroscope bias (GBIAS) is indicated by plot line 720, and a morphed bias over temperature is indicated by plot line 724. A drifted and morphed original bias over temperature model is =GBIAS+Bpwr+GBT*T+GBT2*T^2+GBT3*T^3. An expected bias range over temperature (BR) based on the model is indicated at 728. A trimmed, drifted and morphed original bias over temperature model is =GBIAS−Bpwr+GBT*T+GBT2*T^2+GBT3*T^3. This is indicated by plot line 732.

The following criteria can be applied: if Bpwr is greater than K*BR, then the trim is applied, with K from 2.0 to 3.0. In one example, when BR=100 dph, and Bpwr=300 dph, 300>2*100, so the bias is trimmed.

It is assumed that for a gyroscope bias that drifts over time, the drift manifests primarily as a zero-order drift (i.e., GBIAS drift) more than the temperature dependent bias terms. In a task to be performed for N units, an expected bias range over temperature (BR) is calculated for nominal temperature ranges, such as −10° C. to +50° C. The BR is then used to calculate a minimum threshold (e.g., the minimum bias correction worth performing must be equal to or greater than =K*BR) of bias correction to be applied.

In another embodiment, a look up table can be employed if the gyroscope bias is known as a function of temperature. For example, when a bias is obtained as a function of temperature, and the IMU has in it a temperature sensor, the self-calibration can be performed at power-on using temperature to select a bias offset to apply. Additionally, the status word of an IMU can contain the temperature sensitive correction, which can then be applied at the option of the user.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a method comprising: powering on one or more gyroscopes; after a predetermined first period of time, and upon determining that the one or more gyroscopes is stationary, measuring input rates of rotation during a predetermined second period of time; determining an average rate of rotation for each gyroscope channel based upon the measured input rates of rotation during the predetermined second period of time; after determining the average rate of rotation and after the predetermined second period of time, commencing additional measurements by the one or more gyroscopes; determining calibrated gyroscope measurements by subtracting the average rate of rotation from each of the additional measurements; and providing, at the output of the one or more gyroscopes, the calibrated gyroscope measurements.

Example 2 includes the method of Example 1, wherein determining that the one or more gyroscopes is stationary comprises determining that the input rate of each gyroscope is less than or equal to Earth's spin-rate.

Example 3 includes the method of any of Examples 1-2, further comprising: determining whether the average rate of rotation exceeds a threshold rotation rate level; and if the average rate of rotation exceeds the threshold rotation rate level, then determining the calibrated gyroscope measurements by subtracting the average rate of rotation from each of the additional measurements.

Example 4 includes the method of Example 3, wherein a value of the average rate of rotation that exceeds the threshold rotation rate level corresponds to an average bias shift and is saved as a zero-order offset.

Example 5 includes the method of Example 4, wherein the zero-order offset is adjusted based on one or more temperature variations.

Example 6 includes the method of any of Examples 1-5, wherein the one or more gyroscopes is implemented in an inertial measurement unit (IMU) onboard a vehicle.

Example 7 includes the method of Example 6, wherein the one or more gyroscopes in the IMU includes a set of three gyroscopes having three mutually orthogonal gyroscope axes.

Example 8 includes a method for calibrating at least one gyroscope in an inertial measurement unit (IMU), the method comprising: powering on the IMU; after a predetermined first period of time, and upon determining that the IMU is stationary, measuring input rates of rotation during a predetermined second period of time; determining an average rate of rotation for each gyroscope in the IMU based upon the measured input rates of rotation during the predetermined second period of time; after determining the average rate of rotation and after the predetermined second period of time, commencing additional measurements by the IMU; determining whether the average rate of rotation exceeds a threshold rotation rate level; if the average rate of rotation exceeds the threshold rotation rate level: computing calibrated gyroscope measurements by subtracting the average rate of rotation from each of the additional measurements; and providing at the output of the at least one gyroscope, the calibrated gyroscope measurements; if the average rate of rotation does not exceed the threshold rotation rate level: providing at the output of the at least one gyroscope, only the additional measurements.

Example 9 includes the method of Example 8, wherein determining that the IMU is stationary comprises determining that the input rate of each gyroscope is less than or equal to about 15 degrees per hour.

Example 10 includes the method of any of Examples 8-9, wherein a value of the average rate of rotation that exceeds the threshold rotation rate level corresponds to an average bias shift and is saved as a zero-order offset.

Example 11 includes the method of any of Examples 8-10, wherein the zero-order offset is saved in a status word of the IMU.

Example 12 includes the method of any of Examples 8-11, wherein the IMU is onboard a vehicle.

Example 13 includes the method of Example 12, wherein the vehicle comprises an aircraft, or a dynamic object using the IMU for attitude determination.

Example 14 includes a system comprising: an inertial measurement unit (IMU) including at least one gyroscope and at least one accelerometer, the IMU operative to generate attitude and inertial data; at least one processor operatively coupled to the IMU; and a processor readable medium including instructions to cause the at least one processor to perform a method for providing calibrated measurements at an output of the at least one gyroscope, the method comprising: powering on the IMU; after a predetermined first period of time, and upon determining that the IMU is stationary, measuring input rates of rotation during a predetermined second period of time; determining an average rate of rotation for each gyroscope in the IMU based upon the measured input rates of rotation during the predetermined second period of time; after determining the average rate of rotation and after the predetermined second period of time, commencing additional measurements by the IMU; determining whether the average rate of rotation exceeds a threshold rotation rate level; if the average rate of rotation exceeds the threshold rotation rate level: computing calibrated gyroscope measurements by subtracting the average rate of rotation from each of the additional measurements; and providing at the output of the at least one gyroscope, the calibrated gyroscope measurements; if the average rate of rotation does not exceed the threshold rotation rate level: providing at the output of the at least one gyroscope, only the additional measurements.

Example 15 includes the system of Example 14, wherein the IMU is onboard a vehicle.

Example 16 includes the system of Example 15, wherein the inertial data generated by the IMU includes acceleration data and attitude data for the vehicle.

Example 17 includes the system of any of Examples 15-16, wherein the vehicle is an aircraft.

Example 18 includes the system of any of Examples 14-17, wherein a value of the average rate of rotation that exceeds the threshold rotation rate level corresponds to an average bias shift and is saved as a zero-order offset.

Example 19 includes the system of Example 18, wherein the zero-order offset is adjusted based on one or more temperature variations.

Example 20 includes the system of any of Examples 14-19, wherein the IMU is a micro-electro-mechanical systems (MEMS) based IMU.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method comprising:
powering on one or more gyroscopes;
after a predetermined first period of time, and upon determining that the one or more gyroscopes is stationary, measuring input rates of rotation during a predetermined one or more additional periods of time;
determining an average rate of rotation for each gyroscope channel based upon the measured input rates of rotation during the predetermined one or more additional periods of time, wherein a value of the average rate of rotation corresponds to an average gyroscope bias shift and is saved as a zero-order offset;
adjusting the zero-order offset based on one or more temperature variations, wherein the zero-order offset is adjusted using a polynomial model of gyroscope bias as a function of temperature (gyro bias (T)) expressed as:

$$\text{gyro bias }(T) = Wo + W1*T + W2*T^2 + W3*T^3$$

where Wo is the zero-order offset,
W1, W2, and W3 are coefficients of a $3^{rd}$ order polynomial that represent temperature dependent gyroscope bias terms, and
T is a temperature having a value that is measured at each of the predetermined periods of time;
after determining the average rate of rotation and after the predetermined one or more additional periods of time, commencing additional measurements by the one or more gyroscopes;
determining calibrated gyroscope measurements by subtracting the average rate of rotation, as a function of temperature, from each of the additional measurements; and
providing, at the output of the one or more gyroscopes, the calibrated gyroscope measurements.

2. The method of claim 1, wherein determining that the one or more gyroscopes is stationary comprises determining that the input rate of each gyroscope is less than or equal to Earth's spin-rate.

3. The method of claim 1, further comprising:
determining whether the average rate of rotation exceeds a threshold rotation rate level; and
if the average rate of rotation exceeds the threshold rotation rate level, then determining the calibrated gyroscope measurements by subtracting the average rate of rotation from each of the additional measurements.

4. The method of claim 3, wherein a value of the average rate of rotation that exceeds the threshold rotation rate level corresponds to an average bias shift and is saved as a zero-order offset.

5. The method of claim 1, wherein the one or more gyroscopes is implemented in an inertial measurement unit (IMU) onboard a vehicle.

6. The method of claim 5, wherein the one or more gyroscopes in the IMU includes a set of three gyroscopes having three mutually orthogonal gyroscope axes.

7. A method for calibrating at least one gyroscope in an inertial measurement unit (IMU), the method comprising:
powering on the IMU;

after a predetermined first period of time, and upon determining that the IMU is stationary, measuring input rates of rotation during a predetermined second period of time;

determining an average rate of rotation for each gyroscope in the IMU based upon the measured input rates of rotation during the predetermined second period of time, wherein a value of the average rate of rotation corresponds to an average gyroscope bias shift and is saved as a zero-order offset;

after determining the average rate of rotation and after the predetermined second period of time, commencing additional measurements by the IMU;

determining whether the average rate of rotation exceeds a minimum desired adjustment threshold rotation rate level;

if the average rate of rotation exceeds the minimum desired adjustment threshold rotation rate level:
  computing calibrated gyroscope measurements by subtracting the average rate of rotation from each of real time IMU measurements; and
  providing at the output of the at least one gyroscope, the calibrated gyroscope measurements;

if the average rate of rotation does not exceed the minimum desired adjustment threshold rotation rate level:
  providing at the output of the at least one gyroscope, only the real time IMU measurements.

8. The method of claim 7, wherein determining that the IMU is stationary comprises determining that the input rate of each gyroscope is less than or equal to about 15 degrees per hour.

9. The method of claim 7, wherein the zero-order offset is saved in a status word of the IMU.

10. The method of claim 7, wherein the IMU is onboard a vehicle.

11. The method of claim 10, wherein the vehicle comprises an aircraft, or a dynamic object using the IMU for attitude determination.

12. A system comprising:
an inertial measurement unit (IMU) including at least one gyroscope and at least one accelerometer, the IMU operative to generate attitude and inertial data;
at least one processor operatively coupled to the IMU; and
a processor readable medium including instructions to cause the at least one processor to perform a method for providing calibrated measurements at an output of the at least one gyroscope;

wherein during a calibration event, with the IMU assumed to be static, the method comprises:
  powering on the IMU and starting a calibration timer;
  determining an average rate of rotation for each gyroscope in the IMU based upon measured input rates of rotation, wherein a value of the average rate of rotation corresponds to an average gyroscope bias shift; and
  powering off the IMU, stopping the calibration timer, and saving a calibration time value;
  wherein the average gyroscope bias shift is saved as a zero-order offset;

wherein during a mission event, with the IMU assumed to be dynamic, the method comprises:
  powering on the IMU, and reading a mission timer to determine a mission time value;
  determining whether the mission time value substantially corresponds to the calibration time value; and
  applying the zero-order offset to gyroscope measurements from the IMU when the mission time value substantially corresponds to the calibration time value.

13. The system of claim 12, wherein the IMU is onboard a vehicle.

14. The system of claim 13, wherein the inertial data generated by the IMU includes acceleration data and attitude data for the vehicle.

15. The system of claim 13, wherein the vehicle is an aircraft.

16. The system of claim 12, wherein the zero-order offset is adjusted based on one or more temperature variations.

17. The system of claim 12, wherein the IMU is a micro-electro-mechanical systems (MEMS) based IMU.

18. The method of claim 7, further comprising:
adjusting the zero-order offset based on one or more temperature variations, wherein the zero-order offset is adjusted using a look up table of gyroscope bias as a function of temperature.

19. The method of claim 7, further comprising:
adjusting the zero-order offset based on one or more temperature variations, wherein the zero-order offset is adjusted using a polynomial model of gyroscope bias as a function of temperature.

20. The method of claim 7, wherein the calibrated gyroscope measurements are limited by a maximum correction amount per unit time.

* * * * *